United States Patent
Powell

(10) Patent No.: US 6,880,854 B2
(45) Date of Patent: Apr. 19, 2005

(54) STABILIZING WEIGHT ASSEMBLIES FOR TRACTORS

(75) Inventor: Matthew E. Powell, Fox Lake, WI (US)

(73) Assignee: Deere & Company, Moline, IL (US)

( * ) Notice: Subject to any disclaimer, the term of this patent is extended or adjusted under 35 U.S.C. 154(b) by 24 days.

(21) Appl. No.: 10/159,577

(22) Filed: May 30, 2002

(65) Prior Publication Data

US 2003/0222447 A1 Dec. 4, 2003

(51) Int. Cl.$^7$ ................................................. B60S 9/00
(52) U.S. Cl. ........................ 280/759; 280/757; 280/755
(58) Field of Search ................................. 280/759, 757, 280/755

(56) References Cited

U.S. PATENT DOCUMENTS

| | | | | |
|---|---|---|---|---|
| 1,403,687 A | * | 1/1922 | Hillstrom | 280/767 |
| 1,492,487 A | * | 4/1924 | Stokes | 280/755 |
| 2,641,326 A | * | 6/1953 | Carlson | 180/14.1 |
| 2,701,728 A | * | 2/1955 | Miller | 280/759 |
| 2,986,407 A | * | 5/1961 | Krueger | 280/405.1 |
| 3,480,294 A | * | 11/1969 | Lichti | 172/611 |
| 3,608,645 A | * | 9/1971 | Meiners | 172/491 |
| 4,158,391 A | * | 6/1979 | Clements | 172/22 |
| 4,232,883 A | * | 11/1980 | Bourgeous et al. | 280/759 |
| 4,518,305 A | * | 5/1985 | Stuhrmann | 414/719 |
| 4,522,420 A | * | 6/1985 | Hannappel | 280/755 |
| 4,558,746 A | * | 12/1985 | Powell et al. | 172/421 |
| 4,664,404 A | | 5/1987 | Schultz | |
| 4,772,037 A | * | 9/1988 | Jones | 280/293 |
| 4,909,575 A | * | 3/1990 | Lupton | 299/39.5 |
| 5,071,150 A | * | 12/1991 | Conrad | 280/264 |
| 5,161,935 A | * | 11/1992 | Pelz et al. | 414/679 |
| 5,462,309 A | * | 10/1995 | Jeffers et al. | 280/759 |
| 5,695,204 A | * | 12/1997 | Ford | 280/507 |
| 6,047,791 A | * | 4/2000 | Hoebelheinrich | 187/222 |
| 6,129,164 A | | 10/2000 | Teal et al. | |
| 6,196,342 B1 | | 3/2001 | Teal et al. | |
| 6,257,357 B1 | | 7/2001 | Teal et al. | |
| 6,283,236 B1 | | 9/2001 | Teal et al. | |
| 6,354,388 B1 | | 3/2002 | Teal et al. | |

* cited by examiner

Primary Examiner—Michael J. Carone
Assistant Examiner—M. Thomson
(74) Attorney, Agent, or Firm—Bell, Boyd & Lloyd, LLC

(57) ABSTRACT

The present invention relates to a stabilizing weight assembly for a vehicle, such as a tractor. The stabilizing weight assembly, in one embodiment, includes a weight holder rotatably connected to a weight holder wheel. The weight holder wheel can make contact with the driving surface, depending upon the driving conditions. The stabilizing weight assembly enhances the traction, safety and performance of vehicles such as tractors.

30 Claims, 16 Drawing Sheets

STABILIZING WEIGHT ASSEMBLIES FOR TRACTORS

BACKGROUND OF THE INVENTION

The present invention generally relates to tractors. More specifically, the present invention relates to stabilizing weight assemblies for tractors which increase the traction of the tractors and also stabilize the tractors.

Self-propelled lawn and garden tractors are well known. Some of these self-propelled tractors are riding tractors, and others are walk-behind tractors. When these tractors are driven on slopes or during slippery conditions, the rear drive wheels tend to slip. Therefore, the conventional tractor has treads on the tires of the drive wheels to increase traction and minimize slippage problems.

Despite such treads, the drive wheels on certain tractors tend to slip when a user operates these tractors on slopes. These tractors may be prone to slippage for a variety or reasons. Some of these tractors are relatively light in weight. In others, the weight at the rear end of the tractor is relatively low in comparison to the weight at the front end of the tractor.

Regardless of the cause, when the drive wheels of a tractor slip, a variety of undesirable consequences can occur. The user can experience difficulty in propelling the tractor forward or backward, the rear end of the tractor may sway and the user can experience reduced steering control. Depending on the driving conditions, the reduction in steering control can be especially apparent with tractors which rely upon the rear drive wheels for steering, such as the zero turn radius tractor. Zero turn radius tractors typically have two front swivel wheels and two rear drive wheels. The rear drive wheels rotate independent of one another. The user controls both the speed and the direction of this tractor by controlling the motion of the drive wheels relative to one another.

For tractors such as these which have slippage problems despite treaded tires, weight attachments have been used to increase traction. The weight attachments are typically attached at the rear of the tractor frame to distribute additional weight to the rear drive wheels. This additional weight is known to increase the frictional force acting on the rear drive wheels, resulting in greater traction.

Though such weight attachments are known to increase traction, they are also known to destabilize certain tractors when they are driven up relatively steep inclines. Therefore, there is a need to overcome such slippage problem and such destabilization problem.

SUMMARY OF THE INVENTION

The present invention generally relates to tractors. More specifically, the present invention relates to stabilizing weight assemblies for tractors which increase the traction of the tractors and also stabilize the tractors. The stabilizing weight assembly, when installed on vehicle such as a tractor, increases the weight of the tractor. The increase in weight increases the friction between the tractor wheels and the driving surface. The increase in friction reduces sliding and slippage between the tractor wheels and driving surfaces.

Accordingly, the stabilizing weight assembly increases traction in various driving conditions. The driving conditions can include the slope of a driving surface, the irregularities of a driving surface, the substances or coverings on a driving surface (such as snow, ice, water or mud) and the type of driving condition (such as relatively hard or soft soil, sand or a relatively hard surface). In addition to increasing traction, the stabilizing weight assembly stabilizes the tractor. If a user drives the tractor on a relatively steep slope, or if a user were to otherwise cause the tractor to become unstable, the stabilizing weight assembly transfers the additional weight of the stabilizing weight assembly from the tractor to the driving surface.

In one embodiment, the stabilizing weight assembly includes: (a) a weight holder which holds at least one preferably removable weight member; (b) at least one weight holder wheel which is rotatably connected to the weight holder; and (c) a repositioning mechanism, coupled to the weight holder wheel, which enables the weight holder wheel to move between a plurality of positions relative to a vehicle frame. Preferably, the weight holder wheel is a swiveling caster wheel which changes direction with the changing direction of the vehicle.

It is preferable that the stabilizing weight assembly is connected to the vehicle frame at a position relatively close to the driving surface. In operation, the weight holder wheel is suspended over the driving surface, causing the entire weight of the weight members to be distributed to the vehicle frame. From time to time, the weight holder wheel can make contact with the driving surface, depending upon the driving conditions. For example, if a user drives the vehicle over a bump, the weight holder wheel may make contact with and roll over the bump. Once the weight holder wheel is in contact with the driving surface, the repositioning mechanism enables the weight holder wheel to adjust between a maximum upward position and a maximum downward position. The weight holder wheel adjusts its position within this range when the weight holder wheel receives shocks and upward forces from irregularities in the driving surface.

Furthermore, if one or more of the vehicle wheels becomes suspended over a driving surface by a certain distance, the weight holder wheel makes contact with the driving surface and transfers the weight of the weight members from the tractor to the driving surface. This transfer or redistribution of weight, stabilizes the vehicle. The weight holder wheel can also function as a stop which provides a maximum stabilizing force when the weight holder wheel reaches its maximum upward position.

In one embodiment, the present invention includes a method for enhancing the performance of a tractor. The method includes connecting at least one weight holder to the frame of the tractor, installing at least one weight member in the weight holder, suspending the weight holder on the frame above a driving surface, enabling the weight holder to make contact with a portion of the driving surface when a certain driving condition is present and rolling the weight holder on such portion of the driving surface.

It is therefore an advantage of the present invention to provide stabilizing weight assemblies for tractors and other vehicles.

Another advantage of the present invention is to enhance the performance of vehicles, such as tractors which use one or more drive wheels to control the steering.

Yet another advantage of the present invention is to increase the traction of tractors and other vehicles.

Still another advantage of the present invention is to increase the stability and safety of tractors and other vehicles.

Another advantage of the present invention is to redistribute the additional weight of tractor weights from the tractor to the driving surface when the tractor is driven up a relatively steep incline.

Additional features and advantages of the present invention are described in, and will be apparent from, the following Detailed Description of the Invention and the figures.

DETAILED DESCRIPTION OF THE INVENTION

Figure 14:
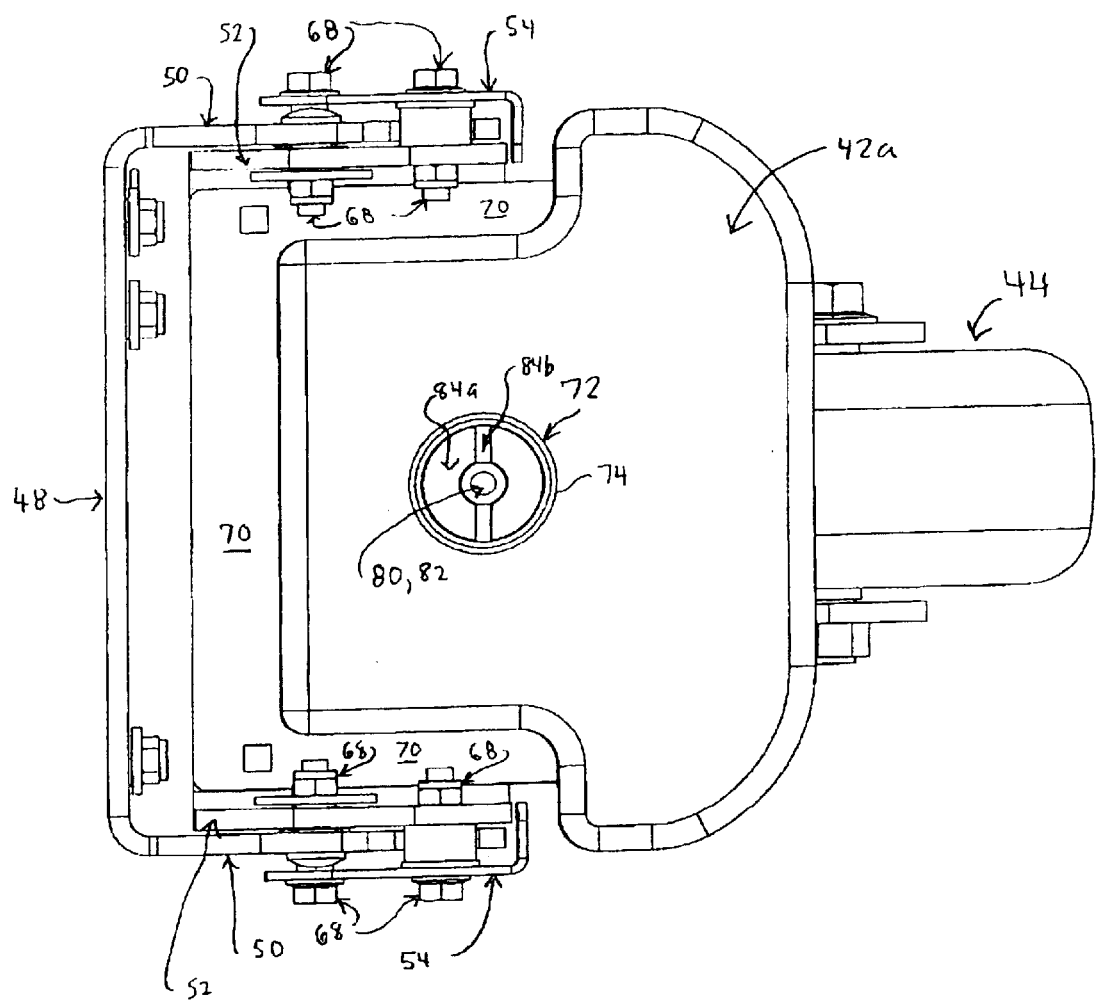
FIG. 14 is top or plan view of the stabilizing weight assembly in one embodiment of the present invention.
Figure 15:
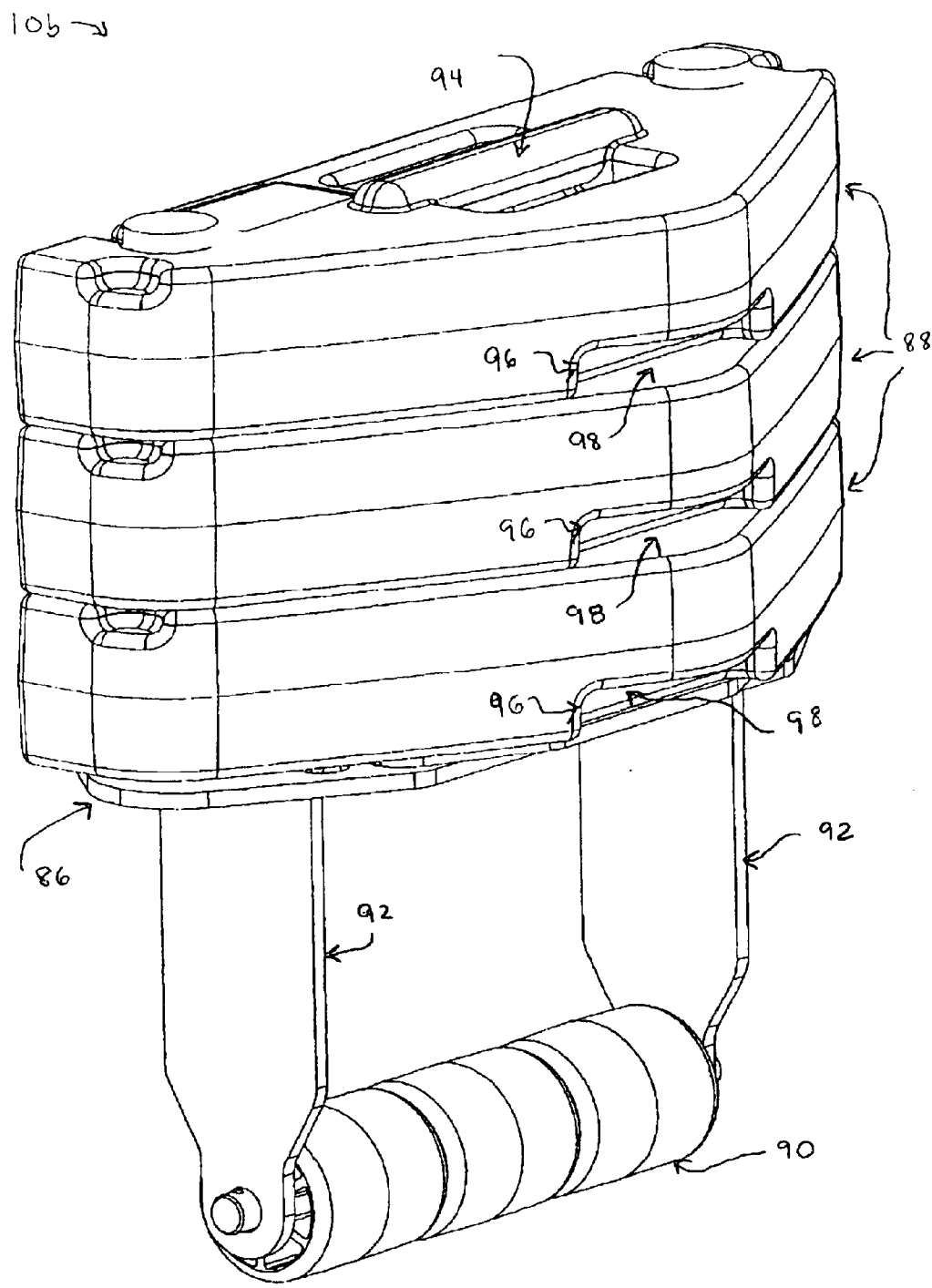
FIG. 15 is an elevated side perspective view of the stabilizing weight assembly in an alternative embodiment of the present invention.
Figure 16:
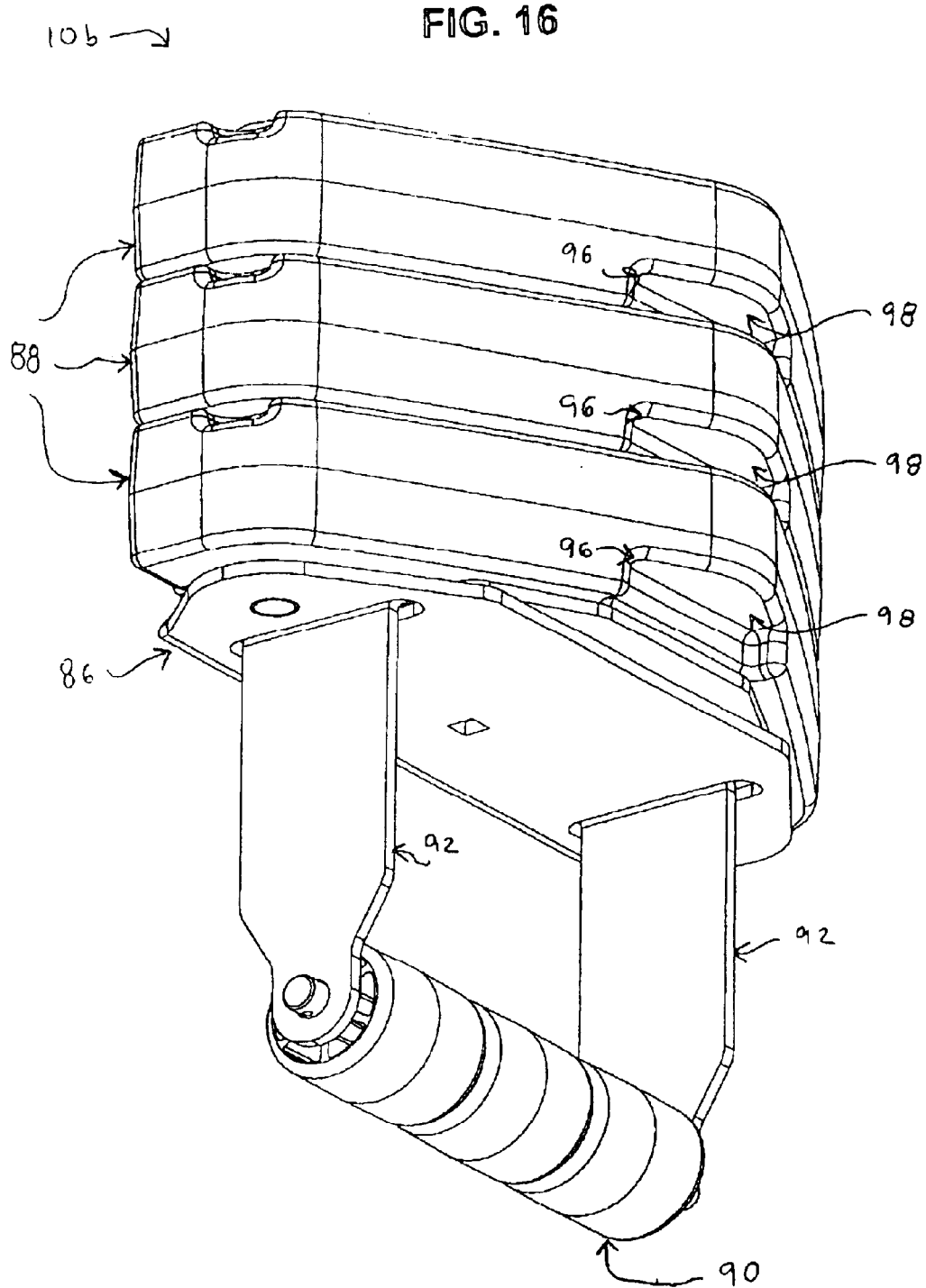
FIG. 16 is an elevated rear perspective view of the stabilizing weight assembly in an alternative embodiment of the present invention.

Referring now to the drawings, FIGS. 1 to 14 illustrate the stabilizing weight assembly 10a in one embodiment of the present invention, and FIGS. 15 and 16 illustrate the stabilizing weight assembly 10b in another embodiment of the present invention. The stabilizing weight assemblies 10a and 10b a generally referred to herein as the stabilizing weight assembly 10.

The stabilizing weight assembly 10 is installed on a vehicle, preferably a tractor 12, for increasing the traction of the tractor 12 and also for stabilizing the tractor 12 to minimize hazards, such as the tractor overturning. Tractor 12, in one embodiment, includes: (a) a tractor frame 14; (b) a plurality of tractor wheels 16 rotatably connected to the tractor frame 14; (c) a body 18 supported by the tractor frame 14; (d) a mowing deck 20 which includes one or more cutting blades (not shown) for cutting grass and other materials; and (d) the stabilizing weight assembly 10, preferably connected to the rear end of the tractor 12.

The tractor frame 14 includes: (a) a plurality of front axles 22 which connect the front wheels 24 to the front end of the tractor 12; (b) preferably one rear axle 26 (shown in FIG. 11 only) which connects the rear drive wheels 28a and 28b to the tractor frame 14; and (c) a support member or mount 30 which functions as a mount for the stabilizing weight assembly 10. The mount 30 preferably includes a horizontal wall 30a connected to a vertical wall 30b for the purposes described below.

The front tractor wheels 24 are preferably caster or swivel-type wheels which are free rotating. Such wheels enable the user to change the direction of the tractor 12 by controlling the motion of the rear drive wheels 28, as described below. The body 18 includes a power unit (not shown) which generates power for propelling the tractor 12 and for driving the cutting blades.

The power unit of the present invention can include any suitable mechanism which generates power, such as a fuel engine or electric motor. Preferably, the power unit is an internal combustion engine. The power unit is coupled to the rear drive wheels 28a and 28b, and the power unit is also coupled to the cutting blades of the mowing deck 20. The tractor 12 can include one or more suitable transmissions or drive mechanisms (not shown) which transmit power from the power unit to the rear drive wheels 28a and 28b and to the mowing deck 20. The drive mechanism can include one or more drive belts, a hydraulic system or any suitable combination thereof.

The tractor 12 also includes a steering linkage mechanism (not shown). The steering linkage mechanism couples the steering wheel 32 to the drive mechanism which drives the rear drive wheels 28a and 28b. By operating foot lever 34 and foot lever 36, the user can cause the rear drive wheels 28a and 28b to rotate in a forward or backward direction. While driving, the user can change the direction of the tractor 12 by rotating the steering wheel 32 in a clockwise or counterclockwise direction. When the user rotates the steering wheel 32, the steering linkage mechanism causes the drive mechanism to change the motion of the rear drive wheels 28a and 28b relative to one another. When this occurs, the tractor 12 changes its course of direction. The rear drive wheels 28a and 28b therefore function as drive steering wheels. It should be appreciated that in other embodiments, the tractor can include any suitable steering device coupled to any suitable steering linkage mechanism. For example, the steering device can include right and left hand control levers for lever-operated mowing machines.

Depending upon how far the user rotates the steering wheel 32, the user can change the course of direction of the tractor 12 by one hundred eighty degrees, three hundred sixty degrees or any other desired angle. For example, if the user desires to make a right turn, the user can rotate the steering wheel 32 clockwise, and the right rear drive wheel 28a will stop rotating or rotate backward. Simultaneously, the left rear drive wheel 28b will rotate forward. The tractor 12 will turn to the right, and the front wheels 24 will swivel to facilitate the turning motion of the tractor 12.

This type of tractor 12 preferably is capable of spinning and making three hundred sixty degree turns with a zero radius. It should be appreciated that tractors and mowing machines other than tractor 12 have the capability of making zero radius turns. For example, one such mowing machine is a walk-behind mowing machine having hand control levers, and another such mowing machine includes a standing frame which enables the user to stand on the mowing machine while operating the mowing machine with hand control levers. The stabilizing weight assembly 10 can be installed on any such mowing machine.

Figure 13:
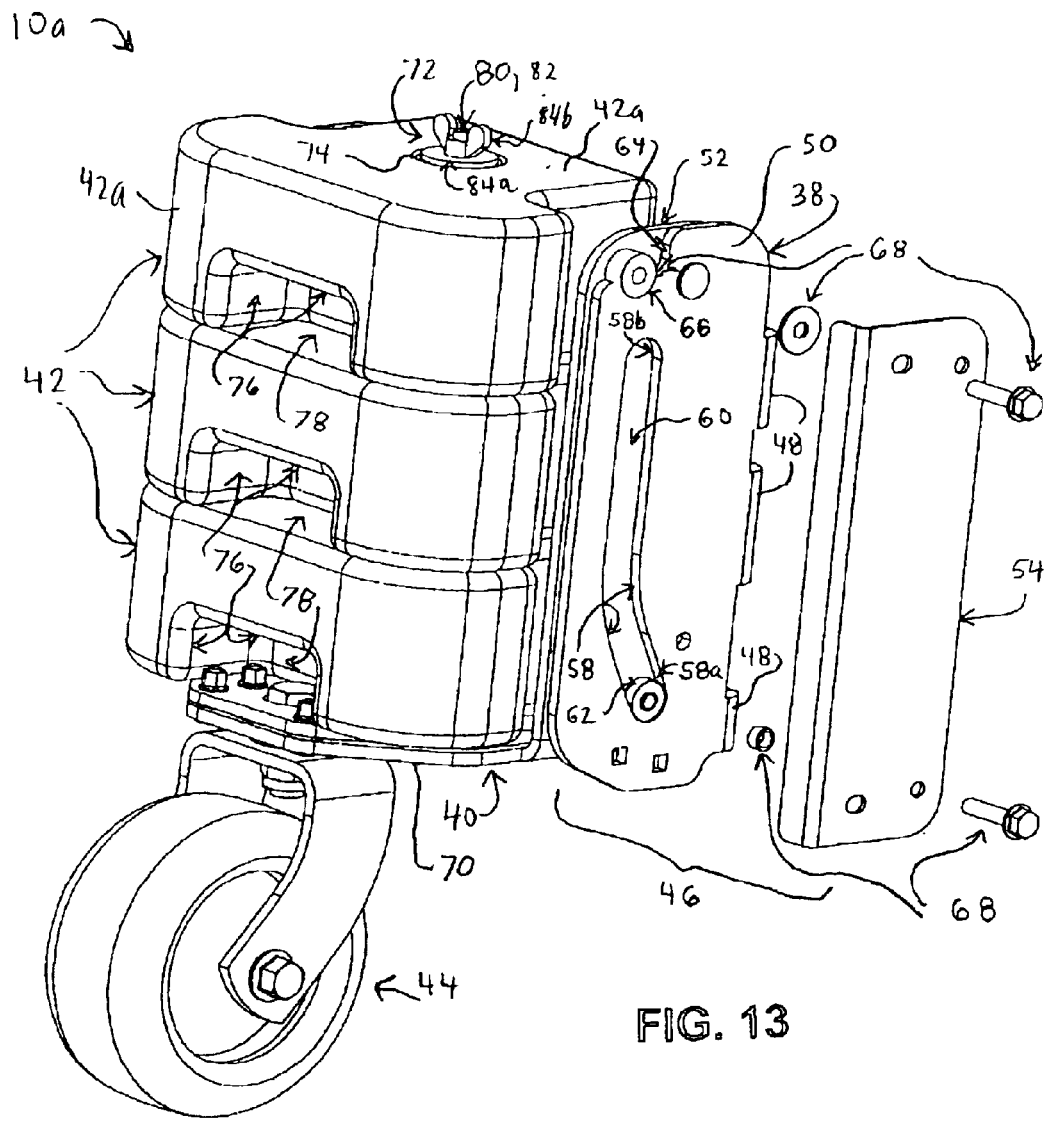
FIG. 13 is an elevated side perspective view of the stabilizing weight assembly including an exploded view of the repositioning mechanism in one embodiment of the present invention.

The stabilizing weight assembly 10 is connected to the frame 14 of the tractor 12. Preferably, the stabilizing weight assembly 10 is connected to the horizontal wall 30a and the vertical wall 30b of the mount 30. As best shown in FIGS. 13 to 15, the stabilizing weight assembly 10 includes: (a) a hitch member 38 connected to the mount 30; (b) a weight holder 40 which holds and supports a plurality of removable weight members 42; and (c) one or more, and preferably one, weight holder wheel 44 connected to the weight holder 40. The hitch member 38 and the weight holder 40 co-act to function as a repositioning mechanism 46 for the weight holder wheel 44, as described below.

The hitch member 38 includes: (a) a rear wall 48 connected, preferably rigidly, to the mount wall 30b of the tractor frame 14; (b) a plurality of side walls 50 which slidably engage the guide walls 52 of the weight holder 40 as described below; and (c) retaining walls 54 which retain the side walls 50 in sliding engagement with the guide walls 52 of the weight holder 40. Each side wall 50 includes a slot wall 58 which defines a slot 60 for receiving bearing 62 of the weight holder 40, and each side wall 50 also includes a stop wall 64 which engages the stop member 66 of the weight holder 40. The stop wall 64 and the stop member 66 co-act to limit the lowest position of the weight holder wheel 44 relative to the tractor frame 14.

The retaining walls 54 are spaced apart from the side walls 50 in order to enable the side walls 50 and the guide walls 52 to slidably engage each other. Preferably, a suitable bolt, spacer and nut fastener 68 is used to rigidly secure the retaining walls 54 to the side walls 50 while enabling the side walls 50 and guide walls 56 to slidably engage each other.

The weight holder 40 includes: (a) lower support wall 70 which provides support for the weight members 42; (b) a plurality of guide walls 52 connected to the lower support wall 70 which provide lateral support and guidance for the positioning of the weight members 42 on the lower support wall 70; and (c) a securing member 72 which secures and fastens the weight members 42 to the lower support wall 70.

Each guide wall 52 includes a wheel or bearing 62 which is rotatably connected to the guide wall 52. The bearing 62 facilitates a sliding motion for the adjustment of the weight holder wheel 44 position, as described below. Each weight member 42 includes a securing wall 74 which defines an opening (not shown) for receiving the securing member 72. In addition, each weight member 42 includes a grip wall 76 which defines a user slot 78 which assists the user in gripping and handling the weight members 42 when installing and removing the weight members 42.

The securing member 72 includes a bolt or rod member 80 having a lower end (not shown) which engages the lower support wall 70. The rod member 80 preferably has an upstanding upper end 82 which extends into and through the securing walls 74 when the weight members 42 are installed onto the weight holder 40. The securing member 72 also includes a suitable fastener 84 which secures the upper end 82 to the uppermost weight member 42a. Preferably, the upper end 82 is threaded, and a washer 84a and nut 84b (such as a wing-nut) secure the upper end 82 to the uppermost weight member 42a. When the nut 84b is tightened, all of the weight members 42 are secured to the lower support wall 70.

The weight holder wheel 44, rotatably connected to the lower support wall 70, is preferably a swivel or caster wheel, as illustrated in FIGS. 1 to 14. The weight holder wheel 44 is the portion of the stabilizing weight assembly 10 which comes into contact with the driving surface when certain driving conditions are present as described below. The weight holder wheel 44, therefore, prevents damage to the driving surface and the stabilizing weight assembly when the stabilizing weight assembly 10 makes contact with the driving surface. As a caster wheel, the weight holder wheel 44 freely swivels with the changing direction of the tractor 12. It should be appreciated that the weight holder wheel 44 of the present invention can include any suitable wheel, including, without limitation, a rigid wheel, a roller, a disk and a ball caster. In the stabilizing weight assembly 10b, illustrated in FIGS. 15 to 16, the weight holder wheel is a roller, as described below.

The guide walls 52 of the weight holder 40 are movable between a plurality of positions relative to the side walls 50. Since the guide walls 52 are part of the weight holder 40, the guide walls 52, weight holder 40, weight members 42 and weight holder wheel 44 all move as one unit, upward and downward, relative to the tractor frame 14. The weight holder wheel 44 can be suspended over the driving surfaces 57a to 57d, as illustrated in FIGS. 2, 4, 6, 7. In this position, the tractor frame 14 is bearing all of the weight of the weight members 42, and the guide walls 52 (and the weight holder wheel 44) are at their lowest position relative to the tractor frame 14. As illustrated in FIG. 13, the lowest position of the guide walls 52 (and the weight holder wheel 44) relative to the tractor frame 14 is determined by the engagement of the stop wall 64 and the stop member 66 and also by the lower end 58a of the slot wall 58. The lower end 58a limits the movement of the bearing 62. The stop member 66 and the bearing 62 transmit the weight of the weight members 42 to the tractor frame 14.

Figure 8:
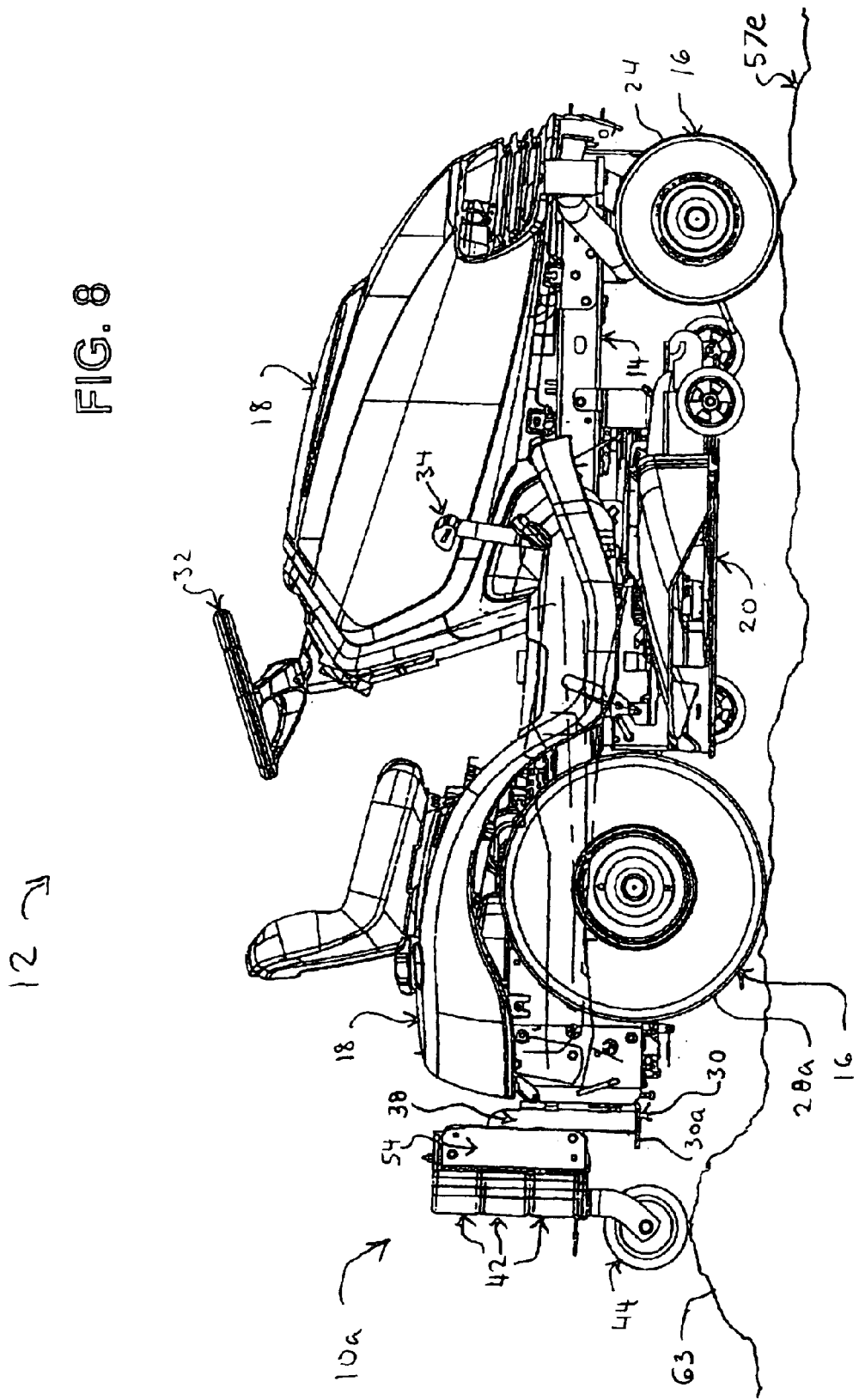
FIG. 8 is a side elevation view of the mowing machine and the stabilizing weight assembly illustrating the mowing machine propelling on an irregular driving surface with the weight holder wheel making contact with the driving surface in one embodiment of the present invention.
Figure 9:
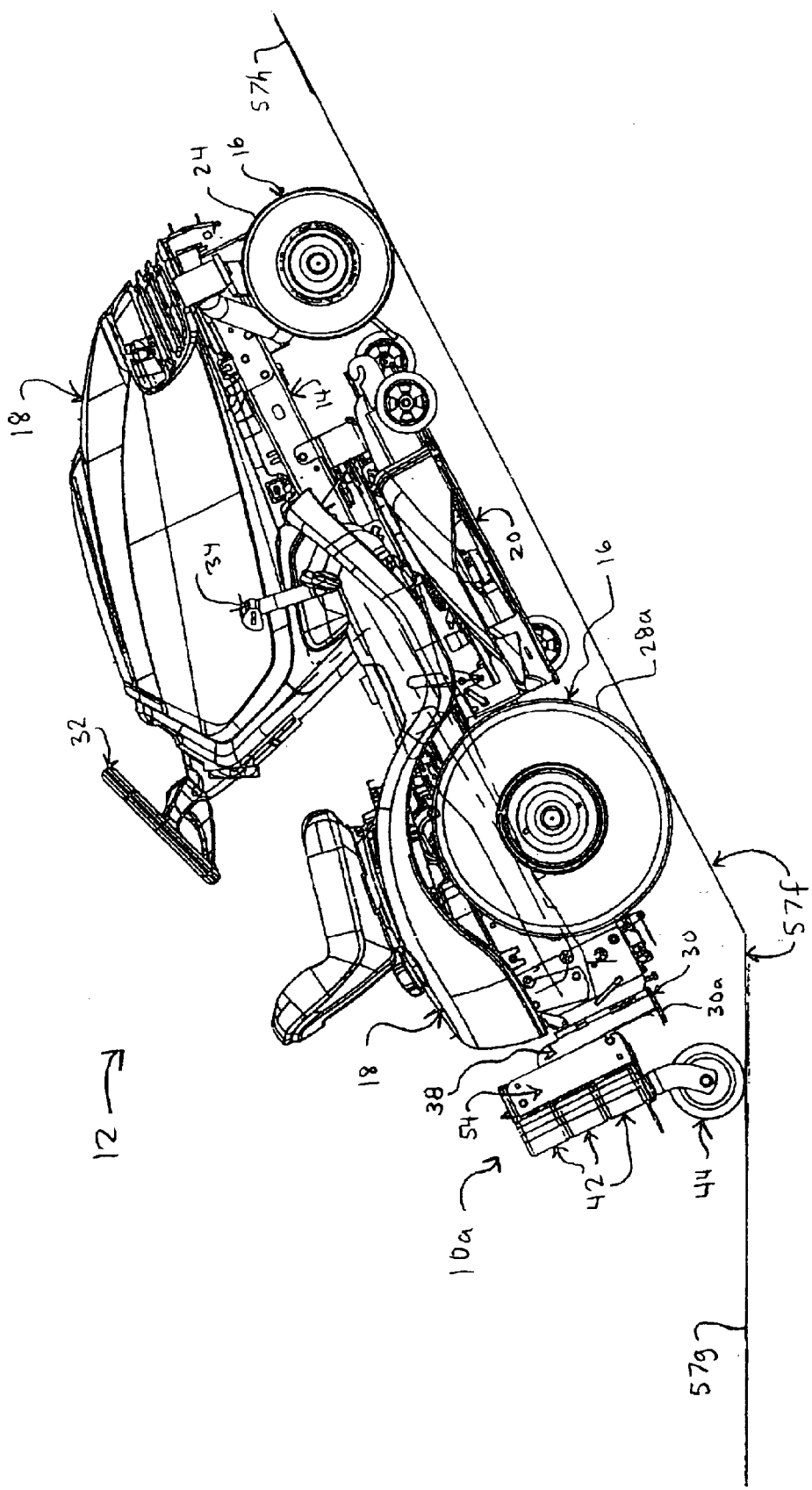
FIG. 9 is a side elevation view of the mowing machine and the stabilizing weight assembly illustrating the mowing machine propelling on an angled driving surface with the weight holder wheel making contact with the driving surface in one embodiment of the present invention.
Figure 10:
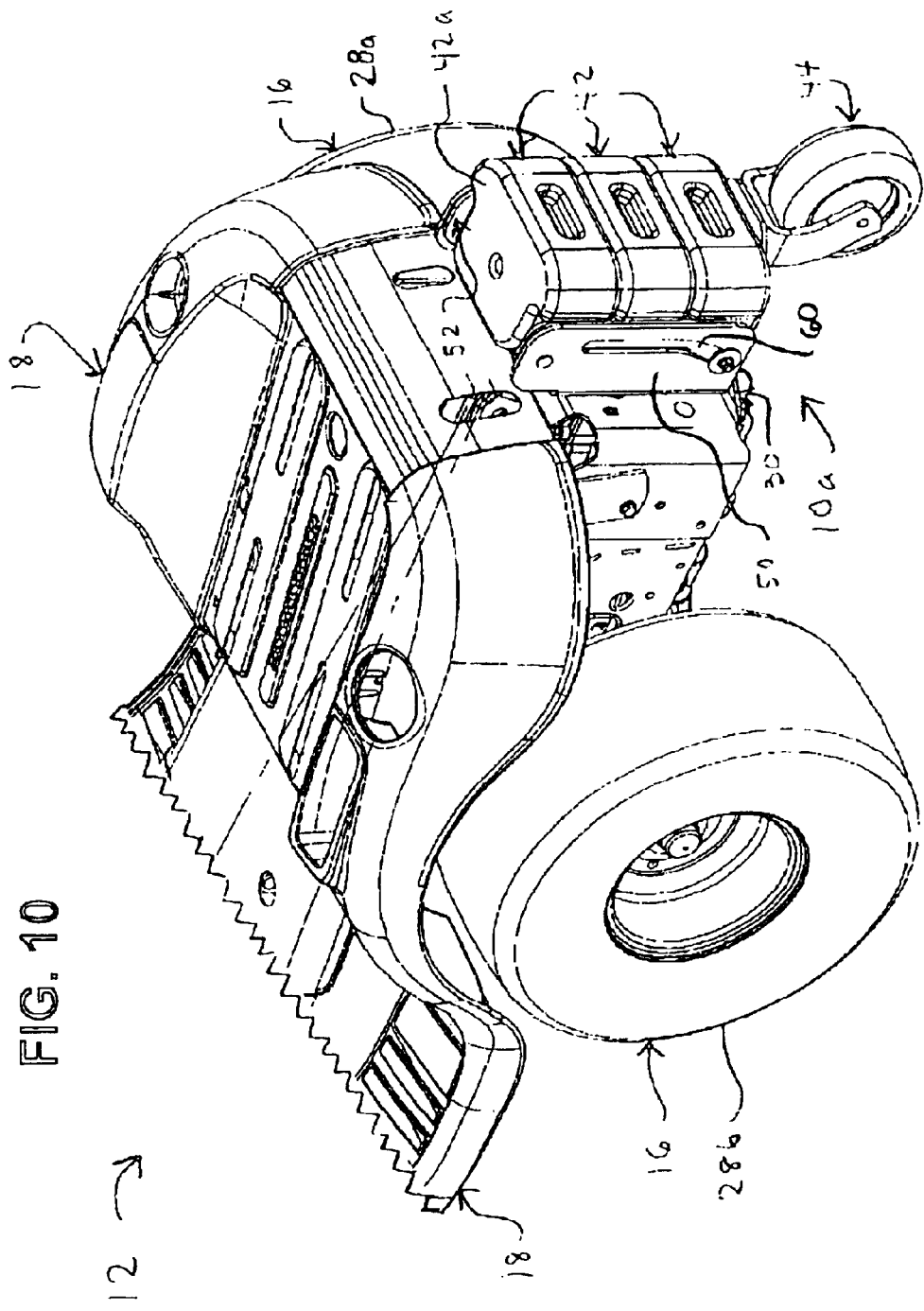
FIG. 10 is a fragmentary elevated side perspective view of the mowing machine and the stabilizing weight assembly in one embodiment of the present invention.
Figure 11:
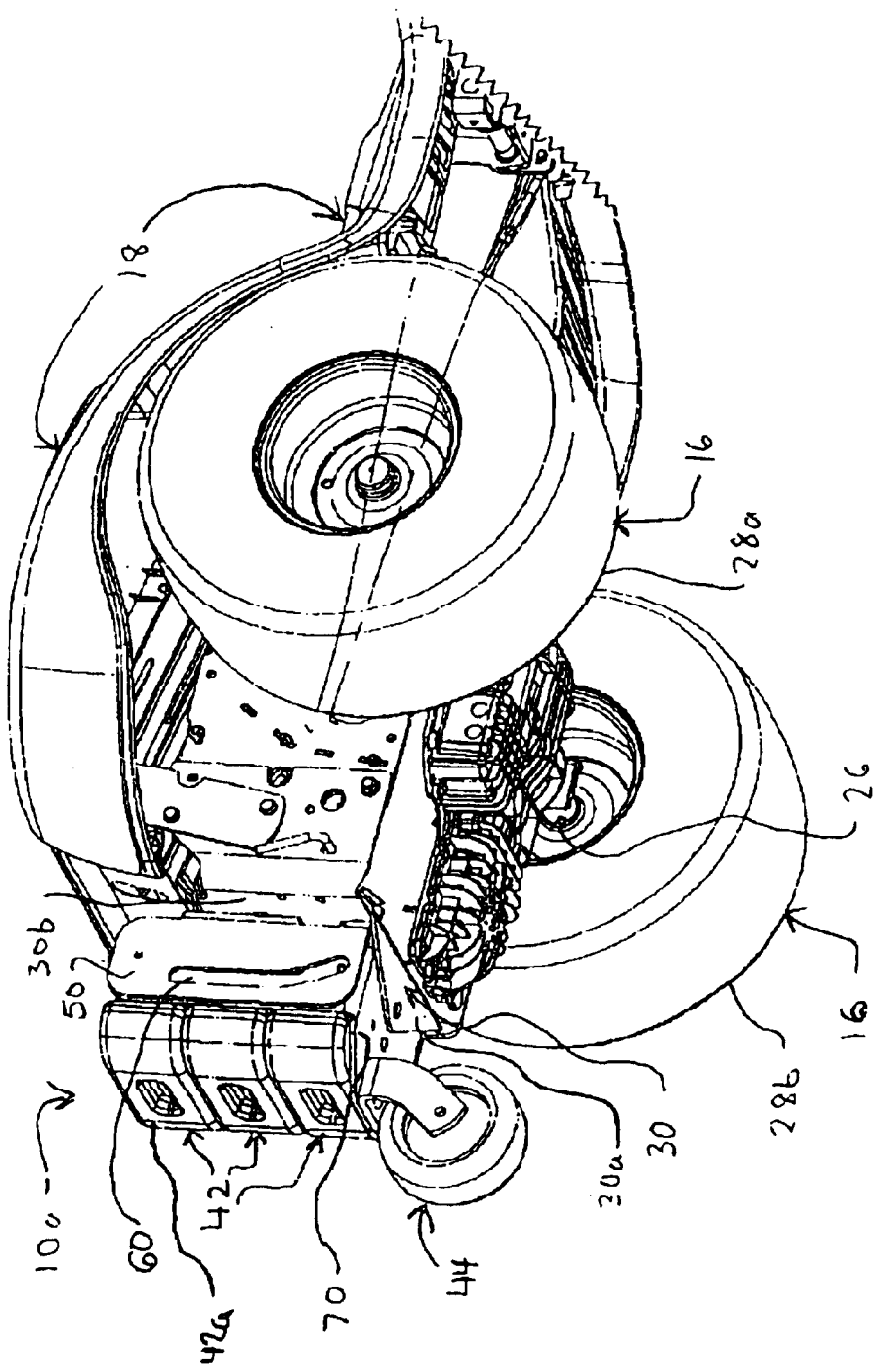
FIG. 11 is fragmentary elevated bottom perspective view of the mowing machine and the stabilizing weight assembly in one embodiment of the present invention.
Figure 12:
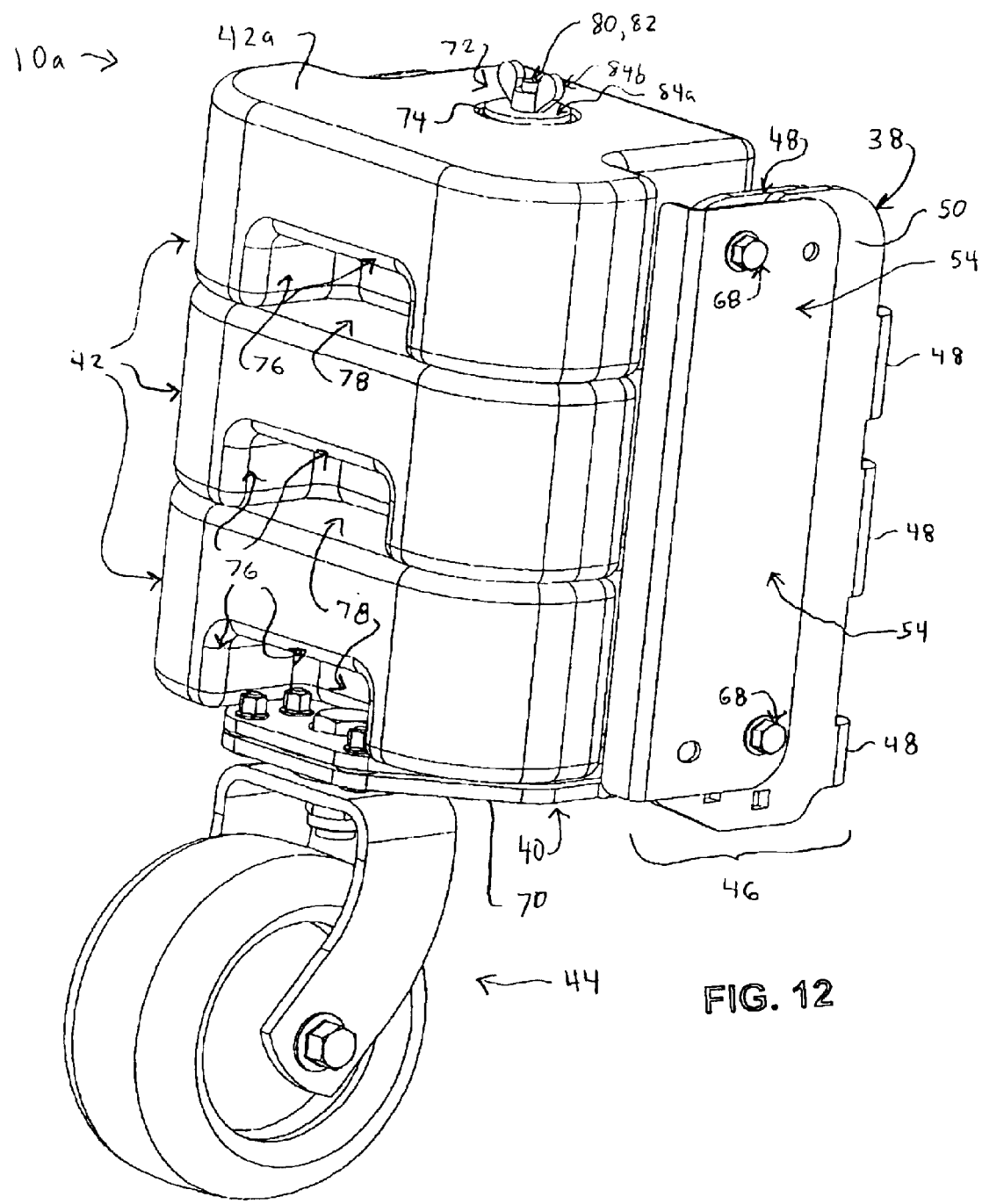
FIG. 12 is an elevated side perspective view of the stabilizing weight assembly in one embodiment of the present invention.

The weight holder wheel 44 can make contact with a variety of driving surfaces, such as an irregular driving surface 57e or a slope or angled driving surface 57f caused by, for example, the intersection of a relatively horizontal driving surface 57g and a trailer ramp 57h. When the weight holder wheel 44 makes contact with the driving surfaces 57e to 57h as illustrated in FIGS. 8 to 9, the guide walls 52 (and the weight holder wheel 44) can move upward to a highest position relative to the tractor frame 14. The highest position of the guide walls 52 (and the weight holder wheel 44) relative to the tractor frame 14 is determined by the upper end 58b of the slot wall 58 which engages the bearing 62.

In operation of one example, if the weight holder wheel 44 is in contact with the driving surface 57e, the weight holder wheel 44 may receive an upward shock or force when the weight holder wheel 44 comes into contact with a bump or raised portion 63 of the driving surface 57e. When this occurs, the guide walls 52 (and the weight holder wheel 44)

move upward, and the bearing 62 upwardly rolls within the slot 60. Depending upon the size of the raised portion 63, the bearing 62 can travel partway or the entire way to the upper end 58b of the slot wall 58. As such, the position of the guide walls 52 (and the weight holder wheel 44) can adjust for variations and irregularities in the driving surface 57e. It should be appreciated that the weight of the weight members 42 absorbs at least part of the upward shock caused by bumps and driving surface irregularities.

As described above, the hitch member 38 and the weight holder 40 co-act to function as a repositioning mechanism 46 for the weight holder wheel 44. The repositioning mechanism 46 enables the stabilizing weight assembly of the present invention to adjust in response to driving surface irregularities in order to reduce wear or damage to the stabilizing weight assembly and the tractor. Although the tractor 12 preferably uses the hitch member 38 and the weight holder 40 to provide this function, it should be appreciated that the tractor 12 can include any suitable repositioning mechanism for the weight holder wheel 44. In one alternative embodiment, the repositioning mechanism includes one or more shock absorbers coupled to the weight holder wheel 44. The shock absorber can include any suitable member, including but not limited to, a spring, oil or air-based shock absorbing member. In another embodiment, the repositioning mechanism is embodied within the weight holder wheel. Here, the weight holder wheel includes an inflatable tire which is pressurized to a relatively low level. Such a tire has a shock absorbing characteristic in and of itself.

Referring back to FIGS. 2, 4, 6 and 7, as long as the user drives the tractor 12 on a uniform flat driving surface, such as driving surfaces 57a to 57d the weight holder wheel 42 is suspended over the driving surfaces 57a to 57d. Preferably the weight holder wheel 42 is suspended approximately one inch over such a driving surface. In this position, the entire weight of the weight members 42 is distributed to the tractor frame 14. This increase in weight increases the frictional force acting between the driving surface and the rear drive wheels 28a and 28b. The increase in frictional force increases the traction of the tractor 12.

Figure 1:
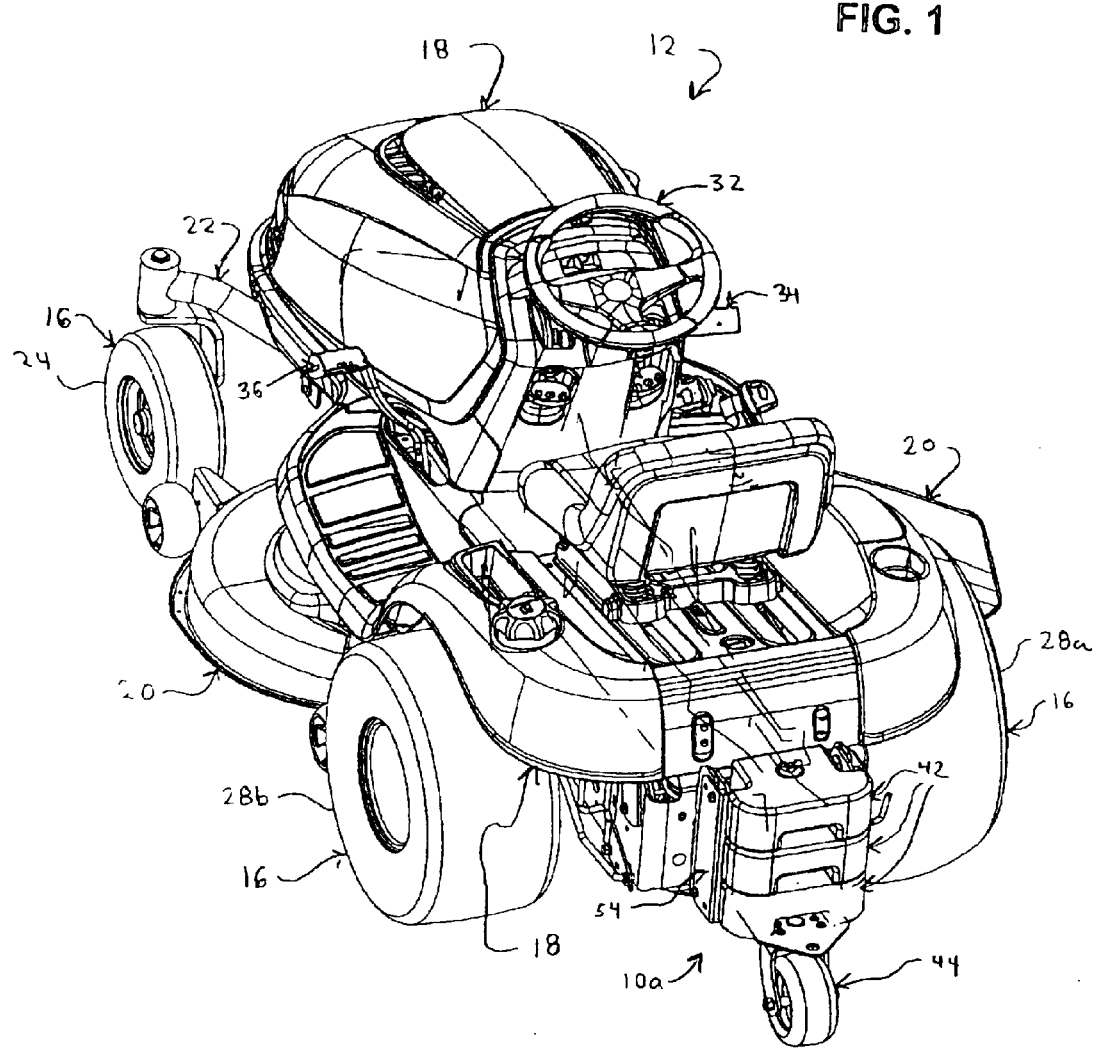
FIG. 1 is an elevated rear perspective view of the mowing machine and the stabilizing weight assembly in one embodiment of the present invention.
Figure 2:
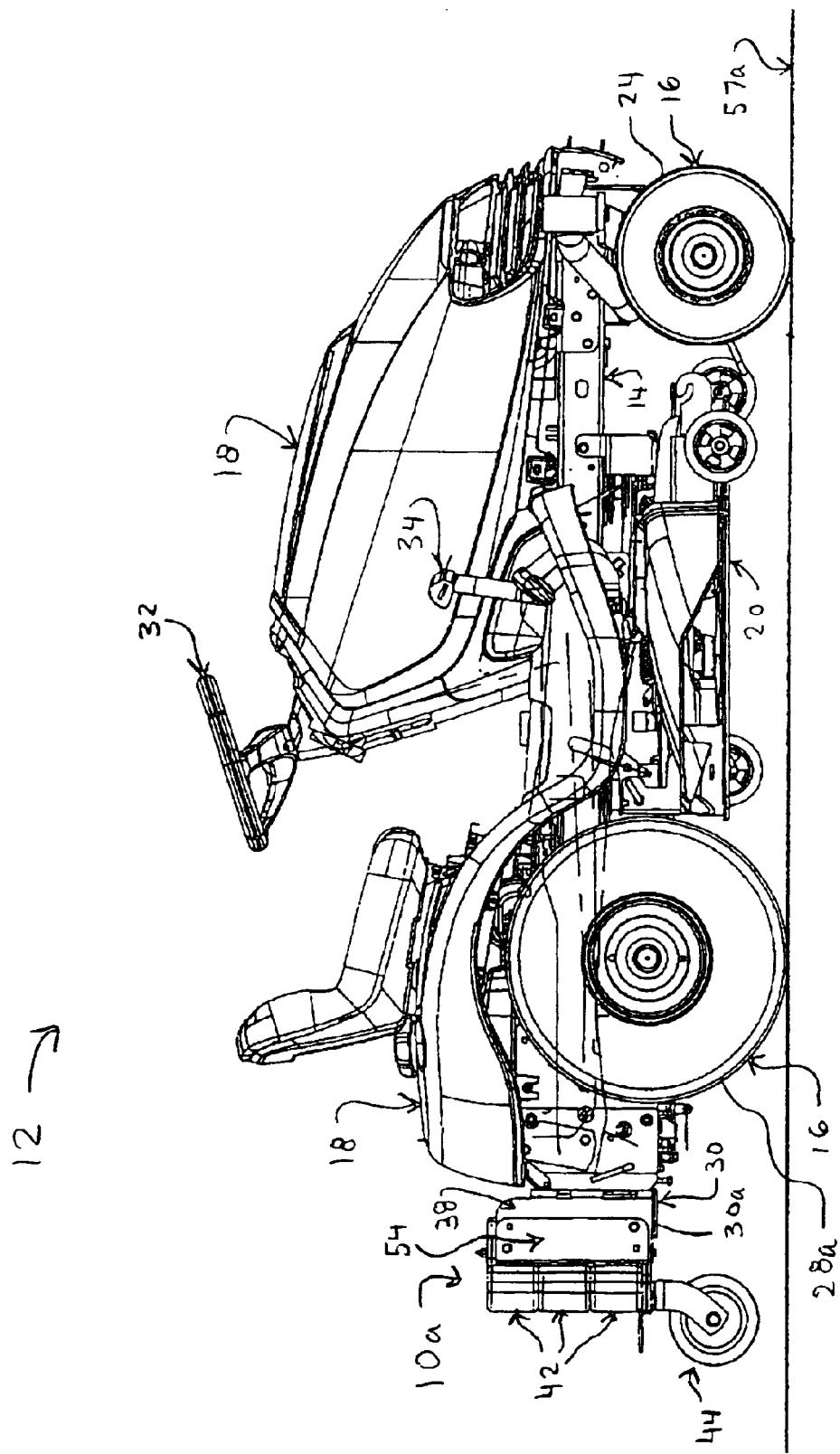
FIG. 2 is a side elevation view of the mowing machine and the stabilizing weight assembly in one embodiment of the present invention.
Figure 3:
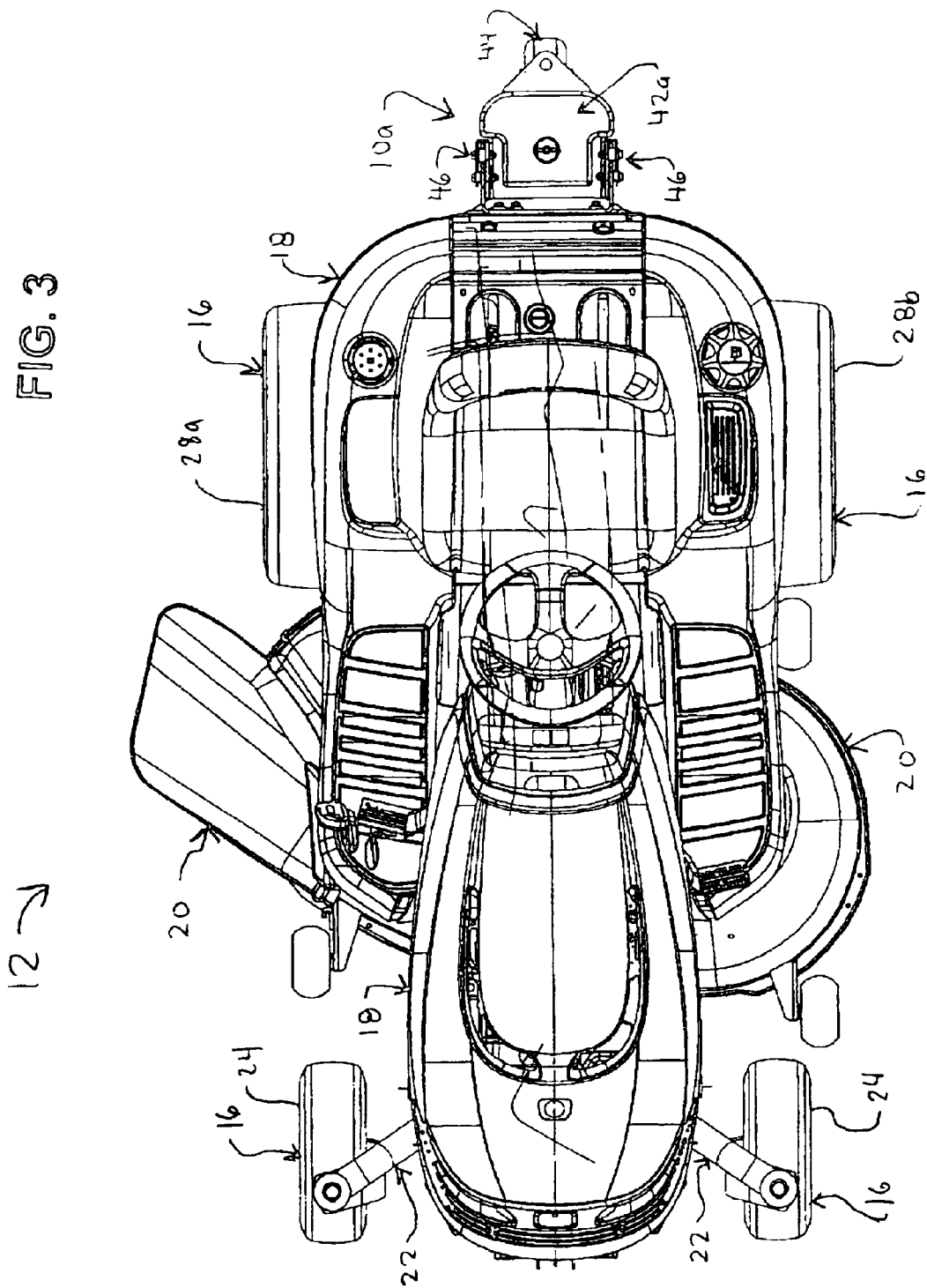
FIG. 3 is top or plan view of the mowing machine and the stabilizing weight assembly in one embodiment of the present invention.
Figure 4:
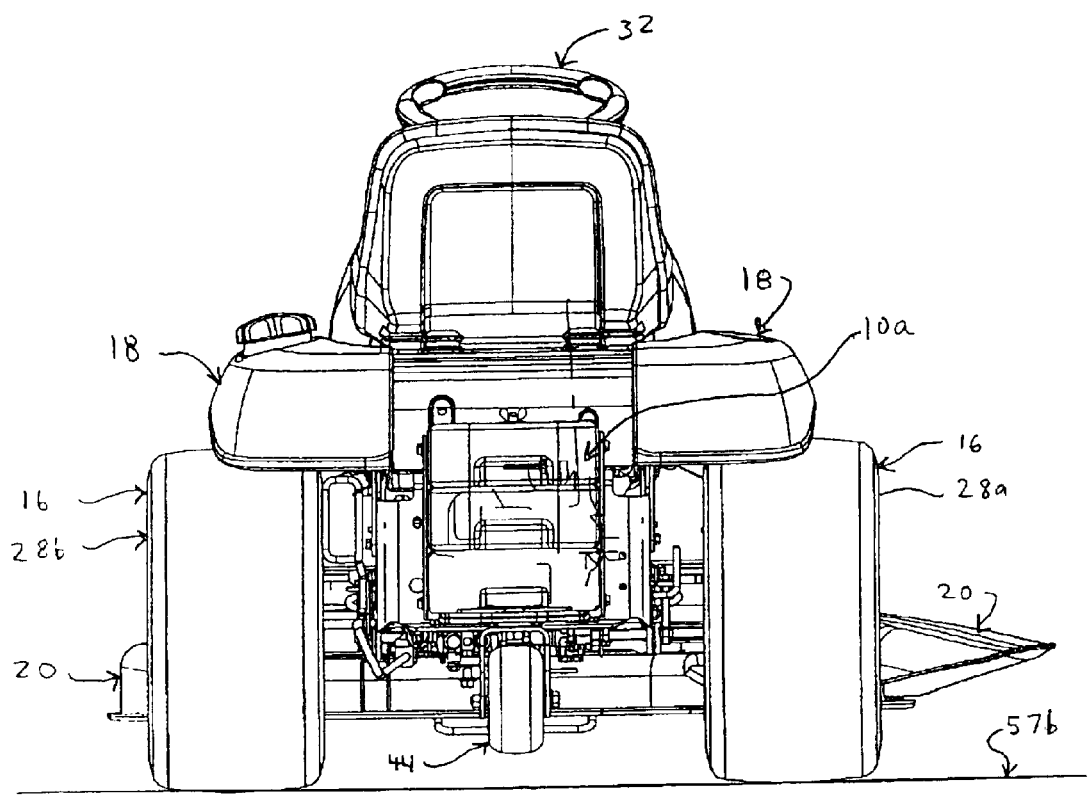
FIG. 4 is a rear elevation view of the mowing machine and the stabilizing weight assembly in one embodiment of the present invention.
Figure 5:
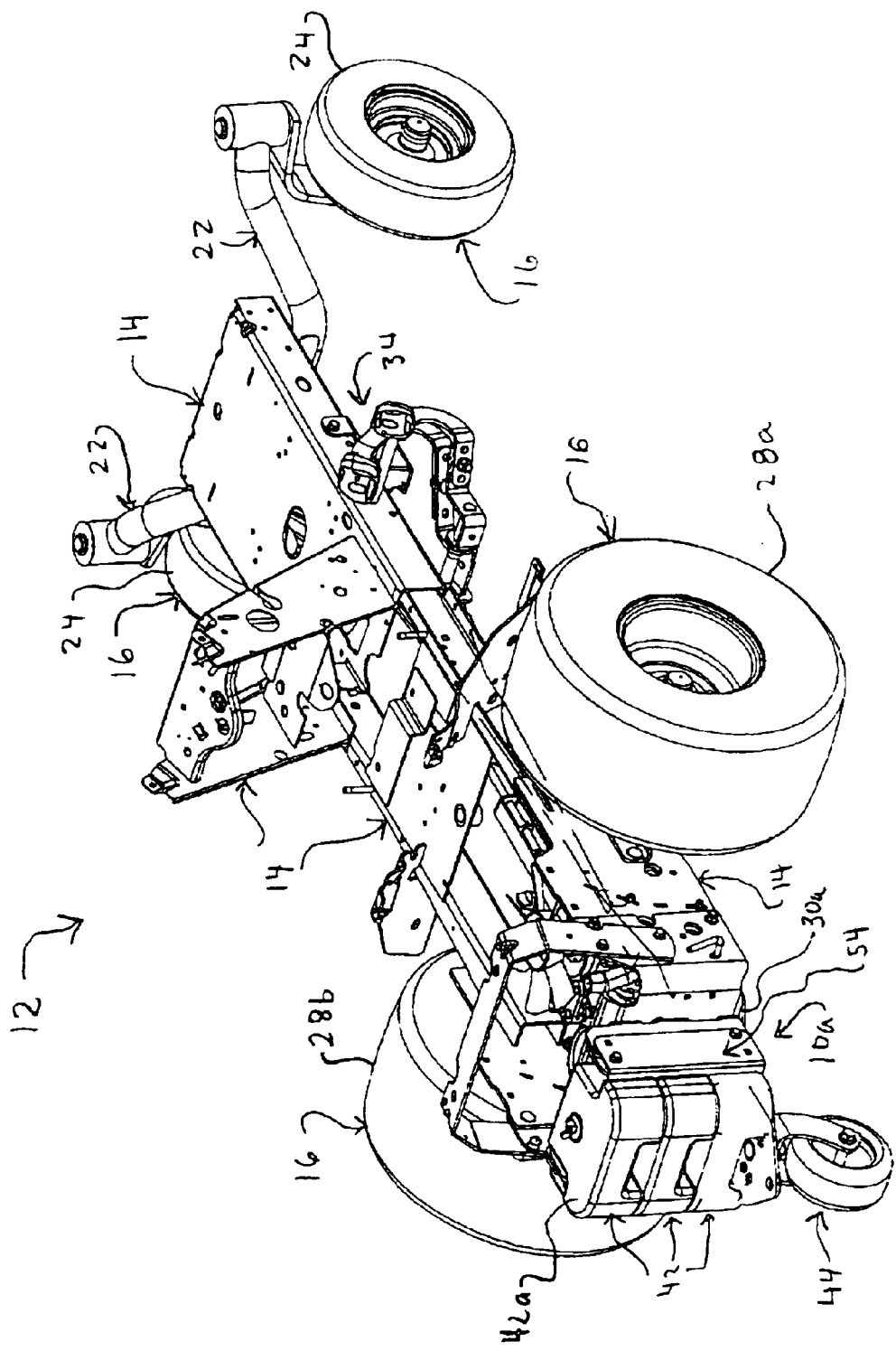
FIG. 5 is an elevated side perspective view of the mowing machine frame and the stabilizing weight assembly in one embodiment of the present invention.
Figure 6:
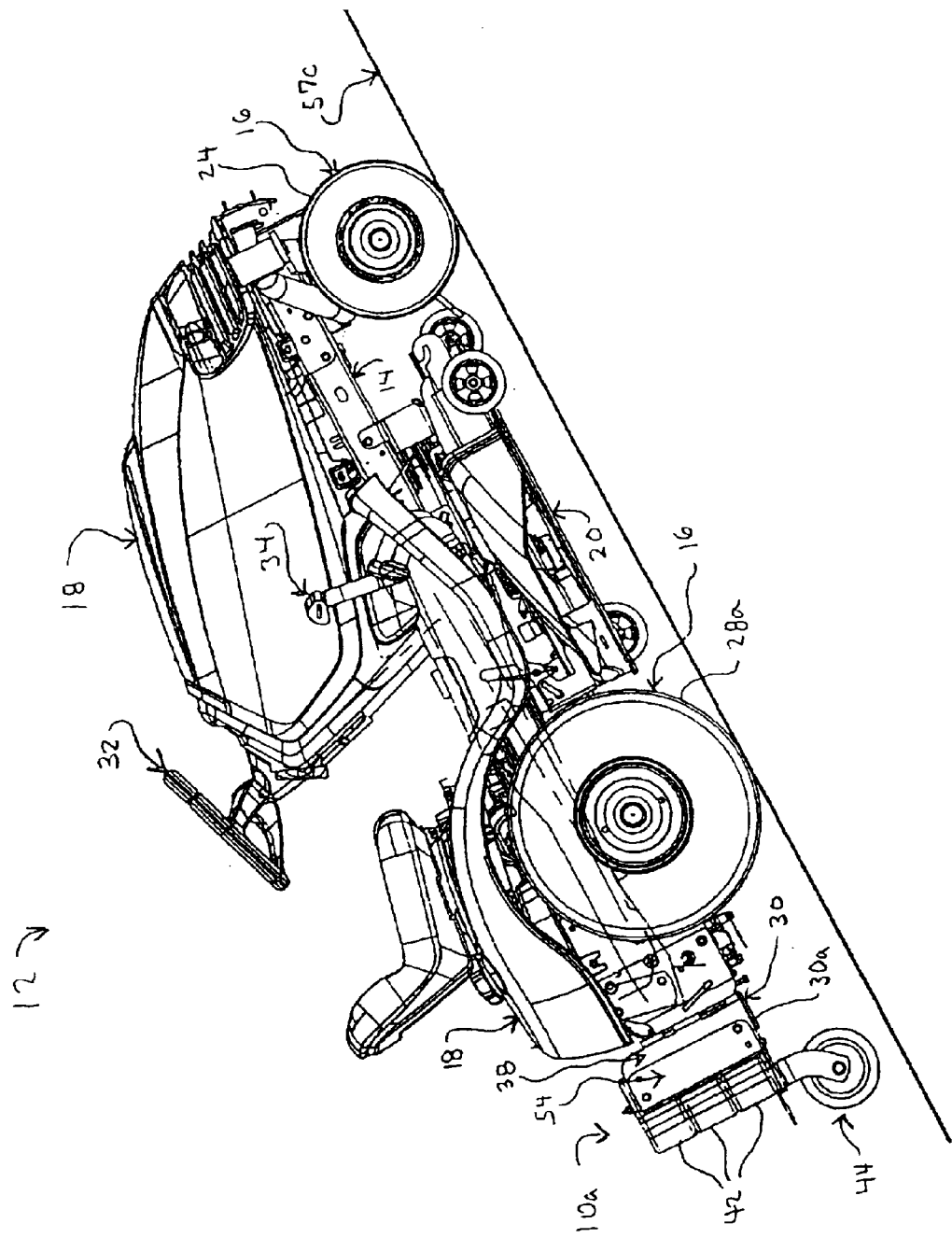
FIG. 6 is a side elevation view of the mowing machine and the stabilizing weight assembly illustrating the mowing machine propelling up an inclined driving surface with the weight holder wheel suspended above the driving surface in one embodiment of the present invention.
Figure 7:
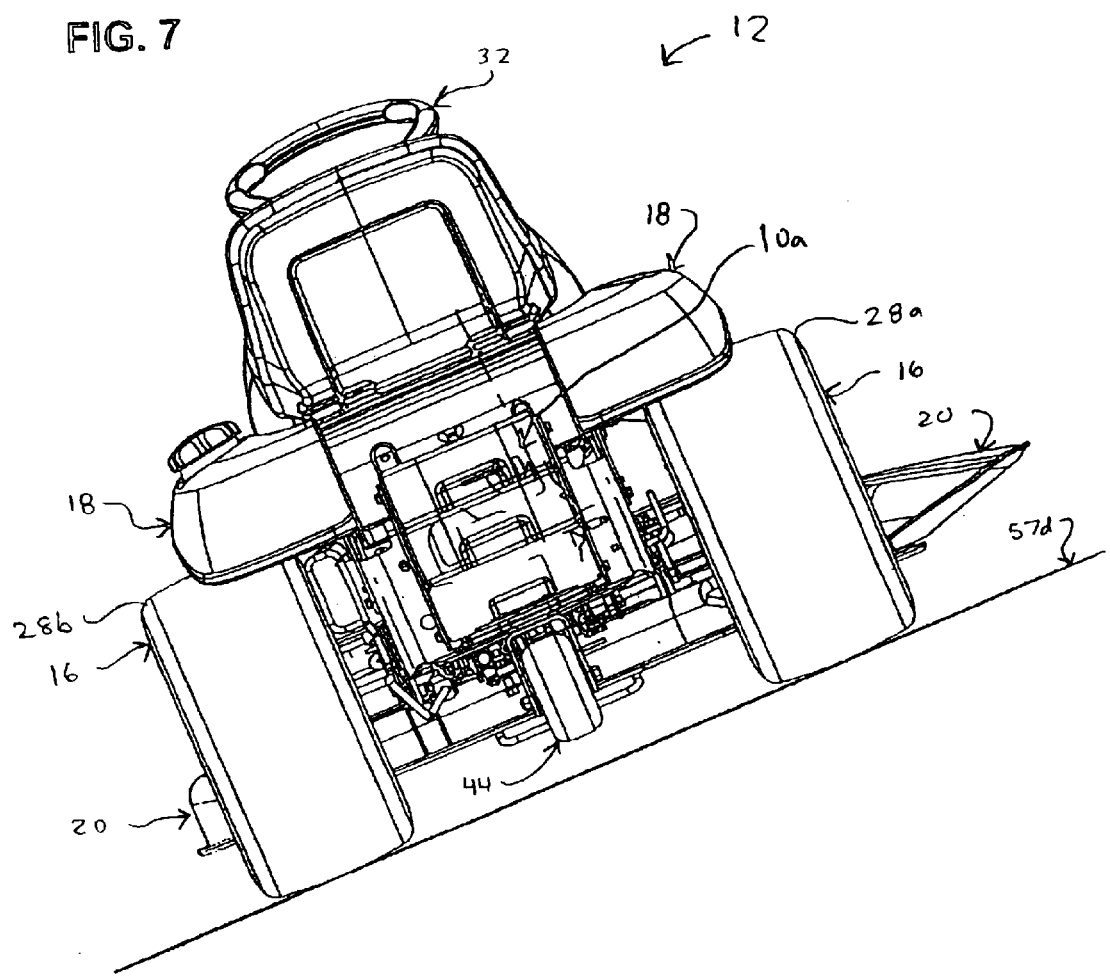
FIG. 7 is a rear elevation view of the mowing machine and the stabilizing weight assembly illustrating the mowing machine propelling laterally across an inclined driving surface with the weight holder wheel suspended above the driving surface in one embodiment of the present invention.

The increase in traction decreases the possibility that any slippage might occur between the rear drive wheels 28a and 28b and the driving surface when the user operates the tractor 12. In one instance, when the user is driving the tractor 12 laterally across a hill, incline or slope, as illustrated in FIG. 7, the increased weight enables the user to maintain control of the steering using the steering wheel 32, despite the force of gravity acting on the tractor 12.

As described above, the steering control for tractor 12 relies on the motion of the rear drive wheels 28a and 28b. When the user turns the steering wheel 32, the steering linkage mechanism causes the rear drive wheels 28a and 28b to have a predetermined motion relative to one another. Any slippage between the rear drive wheel 28a and 28b and the driving surface introduces a variable which can cause a decrease or loss in steering control.

For example, for tractors which do not include the stabilizing weight assembly of the present invention, a user may turn the steering wheel, causing the right rear drive wheel 28a to rotate forward and the left rear drive wheel 28b to rotate backward. Absent slippage, this effect would cause the tractor to rotate in a counterclockwise fashion. However, if the right rear drive wheel 28a slips in place on the driving surface, such a tractor might not turn in a counterclockwise direction. Instead, such tractor could continue in a straight direction, stray or turn in a clockwise direction.

The weight members 42 reduce or prevent such slippage by increasing the weight at the rear end of the tractor 12. Preferably, the total weight of the weight members 42 is between forty pounds and one hundred twenty pounds, where each weight member 42 weighs approximately forty pounds. This amount of weight reduces and preferably prevents any slippage of the rear drive wheels 28a and 28b when the tractor 12 is operated in a lateral motion along an incline (such as driving surface 57d) a slope, a relatively slippery driving surface or on any other terrain.

The additional weight of weight members 42 also facilitates the turning of the tractor 12. This addition weight at the rear of the tractor 12 produces a downward force at the rear end of the tractor frame 14. The rear axle 26 functions as a fulcrum, resulting in a moment. The moment's line of force acts upward at the front end of the tractor 12. Since the rear drive wheels 28 cause the tractor 12 to turn, the tractor 12 turns with greater ease when there is a relatively low degree of friction acting on the front wheels 24. The moment decreases the overall downward force acting on the front wheels 24, thereby facilitating the turning of the tractor 12. As a result, the performance of tractor 12, specifically the ability to turn or spin, is enhanced.

The stabilizing weight assembly of the present invention not only increases the traction and driving performance of the tractor, but the stabilizing weight assembly also stabilizes the tractor. When any tractor is driven in a forward, upward direction up a relatively steep slope or incline, there is a possibility that the tractor will flip or turn over onto the user. This possibility depends upon the angle of the slope, the weight distribution of the tractor, the weight of the user and other factors.

The stabilizing weight assembly provides a safety function which reduces the possibility that tractors will overturn. As described above, the stabilizing weight assembly is preferably positioned on the tractor frame relatively close to the driving surface so that the weight holder wheel is approximately one inch from the driving surface. If the front wheels of a tractor lose contact with the driving surface when the user drives the tractor up an inclined driving surface, the weight holder wheel of the stabilizing weight assembly will eventually make contact with the driving surface. Once contact is made, the weight of the weight members will transfer from the tractor to the driving surface. By redistributing the weight from the rear end of the tractor to the driving surface, the tractor will be less likely to overturn from front to back. In addition, if the weight holder wheel moves to its maximum upward position relative the tractor frame, the weight holder wheel will function as a stop. As a stop, the weight holder wheel will provide a stabilizing force which counteracts the flipping motion or flipping force of the tractor. It should be appreciated that this stabilizing force of the stabilizing weight assembly provides a safety function which is useful when the user drives the tractor in a vertical or diagonal direction up a slope or incline, such as a hill or trailer ramp.

It should also be appreciated that for most driving conditions, the weight holder wheel 44 of the stabilizing weight assembly 10 may not make constant contact with the driving surface. The weight holder wheel 44 may periodically make contact with the driving surface due to irregularities in the driving surface such as bumps, holes, cracks and ditches. When the user drives the tractor 12 over such irregularities, the weight holder wheel 44 will roll over these irregularities. Depending upon the depth or height of the irregularities, the repositioning mechanism 46 may cause the weight holder wheel 44 to move upward relative to the tractor frame 14. Once the weight holder wheel 44 rolls over the irregularity, the weight holder wheel 44 will move downward back to its original position relative to the tractor frame 14.

Referring to FIGS. 15 and 16, the stabilizing weight assembly 10*b* includes a weight holder 86 which supports a plurality of weight members 88 and which is connected to a roller 90 for making contact with a driving surface. The weight holder 86 includes a plurality of legs 92 which are rotatably connected to the roller 90. The stabilizing weight assembly 10*b* also includes a securing member 94 which secures the weight members 88 to the weight holder 86. Each weight member 88 includes a grip wall 96 which defines a slot 98. The slot 98 facilitates the user's installation and removal of the weight members 88 from the weight holder 86.

It should be appreciated that the stabilizing weight assembly of the present invention can be installed and used on any tractor, mowing machine, snow plow machine, snow thrower, vacuum machine, cleaning machine, power tool or recreational vehicle.

The present invention, in one embodiment, includes a stabilizing weight assembly which provides tractors and other vehicles with additional weight for increased traction while simultaneously reducing the hazard of the vehicle flipping over when operated on an incline. The stabilizing weight assembly includes a plurality of removable weight members, preferably connected to the rear end of the vehicle. The additional weight increases the frictional force acting on the rear drive wheels of the vehicle. Such additional friction increases traction. The stabilizing weight assembly is mounted to the rear end of the vehicle at a position relatively close to the driving surface. As a result, the stabilizing weight assembly redistributes weight to the driving surface when certain driving conditions are present in order to stabilize the vehicle. Preferably, the stabilizing weight assembly includes a wheel and a repositioning mechanism which decreases any wear on the stabilizing weight assembly when the stabilizing weight assembly comes into contact with the driving surface. The repositioning mechanism decreases damage to the stabilizing weight assembly and to the vehicle which might be caused by shocks due to irregularities in the driving surface. The stabilizing weight assembly of the present invention provides tractors and other vehicles with increased traction, increased steering control and increased safety.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A stabilizing weight assembly comprising:
   a hitch member having at least one wall;
   a weight holder having at least one wall which slidably engages the wall of the hitch member, the weight holder movable between a plurality of positions relative to the hitch member;
   at least one weight holder wheel rotatably connected to the weight holder, the weight holder wheel movable with the movement of the weight holder;
   a plurality of weight plate members supported by the weight holder, each of the weight plate members having a designated weight; and
   at least one securing member coupled to the weight holder, the securing member movable between a plurality of positions enabling a user to secure the weight plate members to the weight holder and remove the weight plate members from the weight holder.

2. The stabilizing weight assembly of claim 1, wherein the weight holder wheel is selected from the group consisting of a caster wheel, a swivel wheel, a rigid wheel, a roller, a disk, a ball caster and an inflatable tire.

3. The stabilizing weight assembly of claim 1, wherein an assembly of the hitch member and the weight holder includes at least one repositioning mechanism operatively coupled to the weight holder wheel.

4. The stabilizing weight assembly of claim 1, wherein the weight holder has at least one wall which slidably engages a portion of the hitch member.

5. A stabilizing weight assembly comprising:
   a hitch member having at least one wall;
   a weight holder having at least one support wall and at least one guide wall, the guide wall slidably engaged with the wall of the hitch member, the weight holder being movable between a plurality of upward and downward positions relative to the hitch member;
   a plurality of weight plate members removably supported by the support wall, each of the weight plate members having a weight and a securing wall;
   at least one weight holder wheel rotatably connected to the weight holder, the weight holder wheel movable with the movement of the weight holder; and
   at least one securing member coupled to the weight holder, the securing member movable between: (a) a first position engaged with the securing walls of the weight plate members; and (b) a second position disengaged with the securing walls of the weight plate members.

6. The stabilizing weight assembly of claim 5, wherein the weight holder wheel is movable between a plurality of vertical positions relative to the hitch member in cooperation with the movement of the weight holder.

7. The stabilizing weight assembly of claim 5, wherein the support wall of the weight holder includes a surface having a top side engaged with at least one of the weight plate members and a bottom side connected to the weight holder wheel.

8. The stabilizing weight assembly of claim 5, wherein the wall of the hitch member has at least one slot wall defining a slot.

9. The stabilizing weight assembly of claim 5, wherein the securing member includes at least one fastener.

10. The stabilizing weight assembly of claim 5, wherein the weight holder wheel is selected from the group consisting of a caster wheel, a swivel wheel, a rigid wheel, a roller, a disk, a ball caster and an inflatable tire.

11. The stabilizing weight assembly of claim 8, wherein the weight holder has at least one bearing which is rotatably connected to the guide wall, the bearing being engaged with the slot wall of the hitch member.

12. The stabilizing weight assembly of claim 11, wherein the hitch member has at least one retaining wall which couples the wall of the hitch member to the guide wall of the weight holder.

13. A tractor comprising:
   a frame;
   a hitch member coupled to the frame, the hitch member having at least one wall;
   at least one power unit connected to the frame;

at least one drive mechanism coupled to the power unit;

a plurality of tractor wheels rotatably connected to the frame, the tractor wheels having at least one drive wheel coupled to the drive mechanism;

at least one weight holder having at least one wall which is slidably engaged with the wall of the hitch member, the weight holder being movable between a plurality of positions relative to the hitch member;

at least one weight holder wheel rotatably connected to the weight holder, the weight holder wheel movable with the movement of the weight holder;

a plurality of weight plate members supported by the weight holder, each of the weight plate members having a designated weight; and at least one securing member coupled to the weight holder, the securing member movable between a plurality of positions enabling a user to secure the weight plate members to the weight holder and remove the weight plate members from the weight holder.

14. The tractor of claim 13, wherein the weight holder wheel is selected from the group consisting of a caster wheel, a swivel wheel, a rigid wheel, a roller, a disk, a ball caster and an inflatable tire.

15. The tractor of claim 13, wherein the weight holder wheel is movable between a plurality of vertical positions relative to the hitch member in cooperation with a movement of the weight holder relative to the hitch member.

16. The tractor of claim 13, wherein the hitch member has at least one slot wall defining a slot.

17. The tractor of claim 16, wherein the weight holder has at least one bearing which engages the slot wall of the hitch member.

18. The tractor of claim 13, which has a plurality of drive wheels coupled to the drive mechanism.

19. The tractor of claim 18, which has at least one steering device connected to the frame, the steering device operatively coupled to the drive wheels.

20. The tractor of claim 13, wherein the at least one drive wheel comprises a rear drive steering wheel.

21. A stabilizing weight assembly comprising:

a hitch member having at least one substantially vertical wall;

a weight holder having at least one substantially vertical wall which is slidably engaged with the wall of the hitch member, the weight holder movable between a plurality of vertical positions relative to the hitch member;

at least one weight holder wheel rotatably connected to the weight holder, the weight holder wheel extending downwardly from the weight holder, the weight holder wheel being coupled to the weight holder so that: (a) the weight holder wheel is movable between the plurality of vertical positions; and (b) when the weight holder wheel is in contact with a driving surface, the weight holder and the weight holder wheel are movable, in cooperation with one another, between a plurality of upward and downward positions relative to the hitch member in response to changes in the driving surface; and at least one weight plate member removably supported by the weight holder.

22. The stabilizing weight assembly of claim 21, wherein the wall of the hitch member has at least one slot wall defining a slot.

23. The stabilizing weight assembly of claim 21, which includes at least one securing member coupled to the weight holder, the securing member movable between a plurality of positions enabling a user to secure the weight plate member to the weight holder and remove the weight plate member from the weight holder.

24. The stabilizing weight assembly of claim 21, wherein the hitch member includes a rear wall secured to a portion of a vehicle, the vehicle being selected from the group consisting of a tractor, a self-propelled mowing machine, a snow plow machine, a snow throwing machine and a recreational vehicle.

25. A stabilizing weight assembly comprising:

a hitch member including at least one vertical wall;

a weight holder having: (a) at least one vertical wall movably coupled to the vertical wall of the hitch member; and (b) at least one substantially horizontal support wall having a top side and a bottom side, the weight holder movable between a plurality of vertical positions relative to the hitch member;

at least one stop coupled to the vertical wall of the hitch member or weight holder, the stop limiting the movement of the vertical walls relative to one another;

at least one bearing coupled to the vertical wall of the hitch member or weight holder, the bearing reducing friction between the vertical walls;

at least one weight holder wheel rotatably connected to the bottom side of the weight holder, the weight holder wheel movable with the movement of the weight holder; and at least one weight member supported by the support wall and engaged with the top surface of the weight holder, the weight member having a designated weight and at least one securing wall defining at least one opening.

26. The stabilizing weight assembly of claim 25, which includes at least one securing member coupled to the weight holder, the securing member movable between a plurality of positions enabling a user to secure the weight member to the weight holder and remove the weight member from the weight holder, wherein the opening has a size so as to receive a portion of the securing member.

27. The stabilizing weight assembly of claim 25, wherein the weight member includes at least one grip wall defining a slot for gripping the weight member.

28. The stabilizing weight assembly of claim 26, which includes a plurality of weight members supported by the weight holder, the weight members each having a designated weight and at least one securing wall adapted to be engaged with the securing member, the securing wall defining an opening.

29. The stabilizing weight assembly of claim 25, wherein the weight member includes a plate.

30. The stabilizing weight assembly of claim 25, which includes at least one slot wall defined by the vertical wall of the mount member.

* * * * *